United States Patent
Duan et al.

(10) Patent No.: US 9,942,378 B2
(45) Date of Patent: Apr. 10, 2018

(54) DISPLAY DEVICE AND METHOD FOR IMPLEMENTING INCOMING NOTIFICATION FUNCTION WITH RESPECT TO MHL SIGNAL SOURCE

(71) Applicant: SHENZHEN TCL NEW TECHNOLOGY CO., LTD, Shenzhen, Guangdong (CN)

(72) Inventors: Ping Duan, Guangdong (CN); Yangzhi Luo, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 22 days.

(21) Appl. No.: 15/037,692

(22) PCT Filed: Sep. 21, 2015

(86) PCT No.: PCT/CN2015/090147
§ 371 (c)(1),
(2) Date: May 19, 2016

(87) PCT Pub. No.: WO2016/058471
PCT Pub. Date: Apr. 21, 2016

(65) Prior Publication Data
US 2016/0301793 A1    Oct. 13, 2016

(30) Foreign Application Priority Data
Oct. 13, 2014 (CN) .......................... 2014 1 0538112

(51) Int. Cl.
*H04M 1/00* (2006.01)
*H04M 1/725* (2006.01)
(Continued)

(52) U.S. Cl.
CPC ........ *H04M 1/72527* (2013.01); *G06F 13/10* (2013.01); *G09G 5/006* (2013.01);
(Continued)

(58) Field of Classification Search
CPC ...... G06F 13/385; G06F 13/387; G06F 17/28; G06F 21/31; G06F 21/42; G06F 9/4445;
(Continued)

(56) References Cited

U.S. PATENT DOCUMENTS

2012/0023331 A1* 1/2012 Altmann .......... H04N 21/43635
713/168
2015/0264168 A1* 9/2015 Kawaguchi ............. H04M 1/21
455/418

FOREIGN PATENT DOCUMENTS

CN           104090855 A      10/2014

OTHER PUBLICATIONS

International Search Report of PCT Patent Application No. PCT/CN2015/090147 dated Dec. 28, 2015.

* cited by examiner

*Primary Examiner* — Ajibola Akinyemi

(57) ABSTRACT

Disclosed is a display device and a method for implementing an incoming notification function with respect to an MHL signal source. The display device includes: a control module, configured to control, when the display device is in a non MHL signal source pattern, a first MHL interface transfer switch, disposed between a signal decoding processor and an MHL signal source interface of the display device, to be on, and configured to start a background monitoring module electrically connected to the first MHL interface transfer switch, and further configured to display, if an MHL signal source is monitored to be connected, incoming reminder information according to a pre-configured incoming notification information or switch a current
(Continued)

signal source pattern of the display device to be the MHL signal source pattern; and the background monitoring module, configured to monitor whether the MHL signal source is connected.

10 Claims, 8 Drawing Sheets

(51) Int. Cl.

| | | |
|---|---|---|
| G06F 13/10 | (2006.01) | |
| H04N 21/40 | (2011.01) | |
| G09G 5/00 | (2006.01) | |
| H04M 19/04 | (2006.01) | |
| H04W 68/00 | (2009.01) | |
| H04N 21/41 | (2011.01) | |
| H04N 21/414 | (2011.01) | |
| H04N 21/4363 | (2011.01) | |
| H04N 21/472 | (2011.01) | |
| H04N 21/488 | (2011.01) | |

(52) U.S. Cl.
CPC .......... *H04M 19/048* (2013.01); *H04N 21/40* (2013.01); *H04N 21/4122* (2013.01); *H04N 21/41407* (2013.01); *H04N 21/43632* (2013.01); *H04N 21/47214* (2013.01); *H04N 21/4882* (2013.01); *H04W 68/005* (2013.01); *G09G 2370/16* (2013.01)

(58) Field of Classification Search
CPC .. G06F 13/102; G06F 13/4027; G06F 13/409; G06F 13/42; G06F 13/4282; G06F 2213/0016; G06F 2213/0042; G06F 3/03; G06F 3/14; G06F 1/266; G06F 21/62
USPC ........................................................ 455/559
See application file for complete search history.

DISPLAY DEVICE AND METHOD FOR IMPLEMENTING INCOMING NOTIFICATION FUNCTION WITH RESPECT TO MHL SIGNAL SOURCE

TECHNICAL FIELD

The present disclosure relates to the field of communications technologies, and in particular, to a display device and a method for implementing an incoming notification function with respect to an MHL signal source.

BACKGROUND

Mobile terminals can have wired interconnections to terminals with display functions by using Mobile High-Definition Link (Mobile High Definition Link, MHL) technology. For example, a mobile phone can have a wired interconnection to a television, as such, a high-definition video, image and browsed web page, displayed in the mobile phone, can be viewed completely on a screen of the television. By using RCP (Remote Control Protocol) for MHL, a user can also use a remote control of the television to control the operation of the mobile phone, for example, displaying an image or movie, and browsing a message or web page or menu navigation.

As illustrated in FIG. 1, an MHL signal source interface 05 of a television is connected to an MHL signal source interface transfer switch 06. Under an MHL signal source pattern, a control module 07 is configured to control the MHL signal source interface transfer switch 06 to be on so as to send a media signal to a signal decoding processor 03 of the television. Presently, in MHL technology, a mobile phone is discovered by a television only when a user connects/disconnects an MHL cable to an end of the television, that is, connecting or disconnecting the MHL cable to the end of the television causes a voltage signal change of a CD_SENCE I/O PIN pin of the MHL signal source interface 05, the voltage signal change can be monitored by the television, and further the television implements an incoming notification function according to a subsequent handshake signal. However, when the MHL cable is connected to the television successfully but the mobile phone is disconnected to the MHL cable, the CD_SENCE voltage signal of the MHL signal source interface 05 is stable, and in this case, if one connects/disconnects the MHL cable to an end of the mobile phone, only when a current signal source pattern of the television is the MHL signal source pattern, a handshake signal sent by the mobile phone can be monitored by using CBUS handshake mechanism, from which it is determined that an MHL signal source of the mobile phone is connected the television. If the current signal source pattern of the television is not the MHL signal source pattern, as limited by the prior art, the handshake signal output by the mobile phone can not be monitored, therefore the incoming notification function cannot be implemented.

The above content is only for helping understand technical solutions of the present disclosure, and is not the representative acknowledged prior art.

SUMMARY

A major objective of the present disclosure is to solve the technical issue where a display device in a non MHL signal source pattern cannot implement an incoming notification function when an MHL signal source is connected.

To implement the foregoing objective, the present disclosure provides a display device, wherein the display device includes:

a control module, configured to control, when the display device is in a non MHL signal source pattern, a first MHL interface transfer switch, disposed between a signal decoding processor and an MHL signal source interface of the display device, to be on, and configured to start a background monitoring module electrically connected to the first MHL interface transfer switch, and further configured to display, if an MHL signal source is monitored to be connected, incoming reminder information according to a pre-configured incoming notification information or switch a current signal source pattern of the display device to be the MHL signal source pattern; and the background monitoring module, configured to monitor in real time whether the MHL signal source is connected.

Preferably, the background monitoring module includes:

a handshake unit, configured to receive a handshake command of a mobile terminal and establish communication with the mobile terminal;

a setting unit, configured to determine whether a handshake is successful according to the handshake command, and configured to set a flag bit of an MHL flag register of the display device according to a result of the determining; and a determining unit, configured to determine, according to the flag bit, whether the MHL signal source is connected.

Preferably, the control module includes:

a prompting unit, configured to display, if the MHL signal source is monitored to be connected, prompt information indicating whether the current signal source pattern of the display device is switched to be the MHL signal source pattern; and a switching unit, configured to receive a switching instruction and control a second MHL interface transfer switch, pre-disposed between the signal decoding processor and the background monitoring module, to be on according the switching instruction, and configured to switch the current signal source pattern of the display device to be the MHL signal source pattern.

Preferably, the display device further includes:

a configuring module, configured to configure the incoming notification information of the display device to be the incoming reminder information or switching information indicating the current signal source pattern of the display device is switched to be the MHL signal source pattern, and configured to provision an incoming notification function of the display device.

In addition, to implement the foregoing objective, the present disclosure further provides a method for implementing an incoming notification function with respect to an MHL signal source, applied in a display device, wherein the method for implementing an incoming notification function with respect to an MHL signal source includes the following steps:

controlling, when the display device is in a non MHL signal source pattern, a first MHL interface transfer switch, disposed between a signal decoding processor and an MHL signal source interface of the display device, to be on, and starting a background monitoring module electrically connected to the first MHL interface transfer switch;

monitoring, by the background monitoring module in real time, whether an MHL signal source is connected; and displaying, if the MHL signal source is monitored to be connected, incoming reminder information according to a pre-configured incoming notification information, or switching a current signal source pattern of the display device to be the MHL signal source pattern.

Preferably, the step of the monitoring, by the background monitoring module in real time, whether an MHL signal source is connected includes:

receiving a handshake command of a mobile terminal and establishing communication with the mobile terminal;

determining whether a handshake is successful according to the handshake command, and setting a flag bit of an MHL flag register of the display device according to a result of the determining; and determining, according to the flag bit, whether the MHL signal source is connected.

Preferably, the step of the switching a current signal source pattern of the display device to be the MHL signal source pattern includes:

displaying, if the MHL signal source is monitored to be connected, prompt information indicating whether the current signal source pattern of the display device is switched to be the MHL signal source pattern; and receiving a switching instruction and controlling a second MHL interface transfer switch, pre-disposed between the signal decoding processor and the background monitoring module, to be on according the switching instruction, and switching the current signal source pattern of the display device to be the MHL signal source pattern.

Preferably, the method for implementing an incoming notification function with respect to an MHL signal source further includes:

configuring the incoming notification information of the display device to be the incoming reminder information or switching information indicating the current signal source pattern of the display device is switched to be the MHL signal source pattern, and provisioning an incoming notification function of the display device.

The present disclosure provides a display device and a method for implementing an incoming notification function with respect to an MHL signal source. The display device is in a non MHL signal source pattern, when the display device is connected to a mobile terminal by using a MHL cable, whether an MHL signal source is connected is monitored in real time in the background by turning a first MHL interface transfer switch on. If it is monitored that the MHL signal source is connected, based on an incoming notification information pre-configured by a user, an incoming reminder information is displayed on the display device, or a current signal source pattern of the display device is switched to be the MHL signal source pattern. As a result, the display device implements an incoming notification function in the non MHL signal source pattern, and the display device does not need to be switched in the MHL signal source pattern for implementing the incoming notification function, which provides the users convenience.

To make the objectives, features, and advantages of the present disclosure more comprehensible, the following describes the embodiments of the present disclosure with reference to the accompanying drawings.

DESCRIPTION OF EMBODIMENTS

It should be understood that the specific embodiments described herein are merely used for describing the present disclosure, but are not intended to limit the present disclosure.

Figure 1:
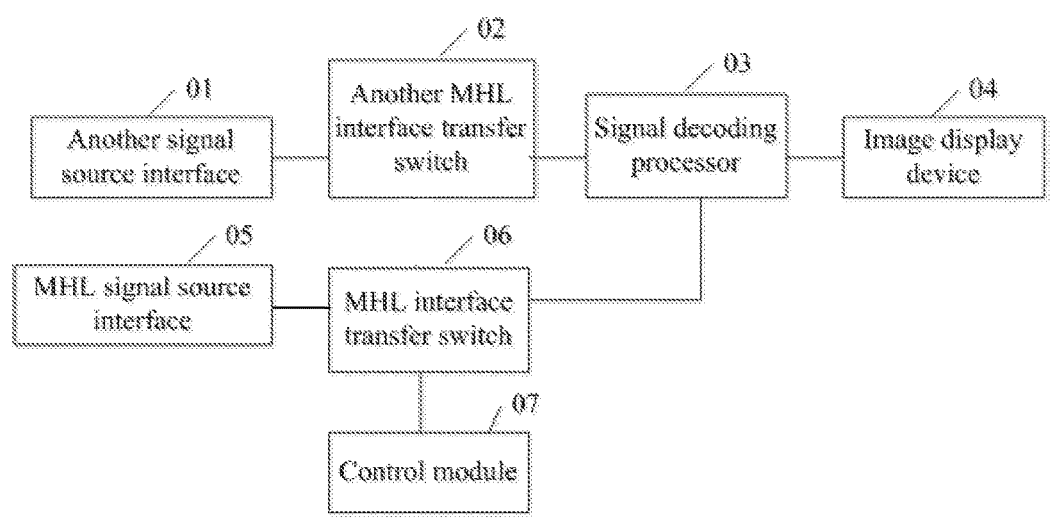
FIG. 1 is an exemplary structural diagram of a display device connected to a signal in the prior art.
Figure 2:
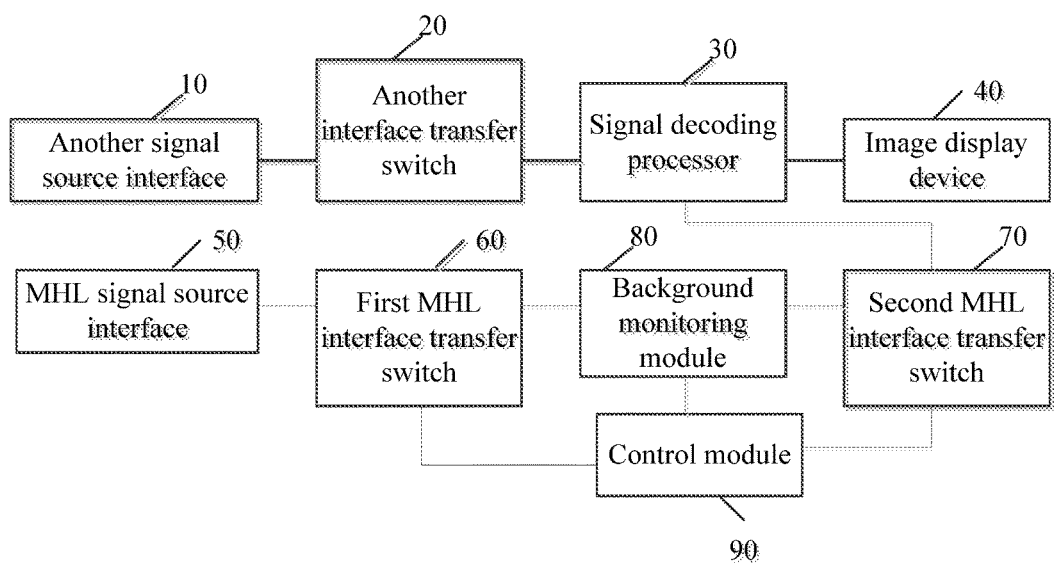
FIG. 2 is an exemplary structural diagram of an embodiment of a display device according to the present disclosure.

The present disclosure provides a display device. As illustrated in FIG. 2, in an embodiment, the display device includes:

a control module 90, configured to control, when the display device is in a non MHL signal source pattern, a first MHL interface transfer switch 60, disposed between a signal decoding processor 30 and an MHL signal source interface 50 of the display device, to be on, and configured to start a background monitoring module 80 electrically connected to the first MHL interface transfer switch 60, and further configured to display, if an MHL signal source is monitored to be connected, incoming reminder information according to a pre-configured incoming notification information or switch a current signal source pattern of the display device to be the MHL signal source pattern; and the background monitoring module 80, configured to monitor whether the MHL signal source is connected.

In the embodiment, the display device may be a television or another display device, and a mobile terminal may be a mobile phone or a tablet. Throughout the present disclosure, the display device is exemplified as the television, and the mobile terminal is exemplified as the mobile phone. The mobile phone and television both have MHL signal source interfaces, and the mobile phone is connected to the television by using an MHL cable.

By using a remote control and a panel, a user sends a signal switching command to the television to be switched in any non MHL signal source pattern, that is the television is watched in the non MHL signal source pattern, and the non MHL signal source pattern includes a WiFi signal source pattern, a VGA signal source pattern or a USB signal source pattern. When the MHL cable is connected to television successfully, and an incoming notification function is turned on, after the mobile phone is connected to television by using the MHL cable, the background monitoring module 80 of the television performs monitoring in real time in the background and monitors whether the MHL signal source is connected.

In a specific implementation manner, the control module 90 is specifically configured to control, when the display device is in the non MHL signal source pattern, the first MHL interface transfer switch 60, disposed between the signal decoding processor 30 and the MHL signal source interface 50 of the display device, to be on, and the background monitoring module 80 monitors whether the MHL signal source is connected in real time in the background.

In the embodiment, the user can pre-configure the incoming notification information to be reminder information or signal source pattern switching information. If it is monitored that the MHL signal source is connected, when the incoming notification information is configured to be the reminder information, the incoming reminder information is displayed on the television to remind the user; when the incoming notification information is configured to be signal source pattern switching information, the current signal source pattern of the display device is directly switch to be the MHL signal source pattern by the television, so that a media file in the mobile phone can be displayed on the television.

Compared with the prior art, in the embodiment, the display device is in a non MHL signal source pattern, when the display device is connected to a mobile terminal by using an MHL cable, whether an MHL signal source is connected is monitored in real time in the background by turning a first MHL interface transfer switch on. If it is monitored that the MHL signal source is connected, based on an incoming notification information pre-configured by a user, an incoming reminder information is displayed on the display device, or a current signal source pattern of the display device is switched to be the MHL signal source pattern. As a result, the display device implements an incoming notification function in the non MHL signal source pattern, and the display device does not need to be switched in the MHL signal source pattern for implementing the incoming notification function, which provides the users convenience.

Figure 3:
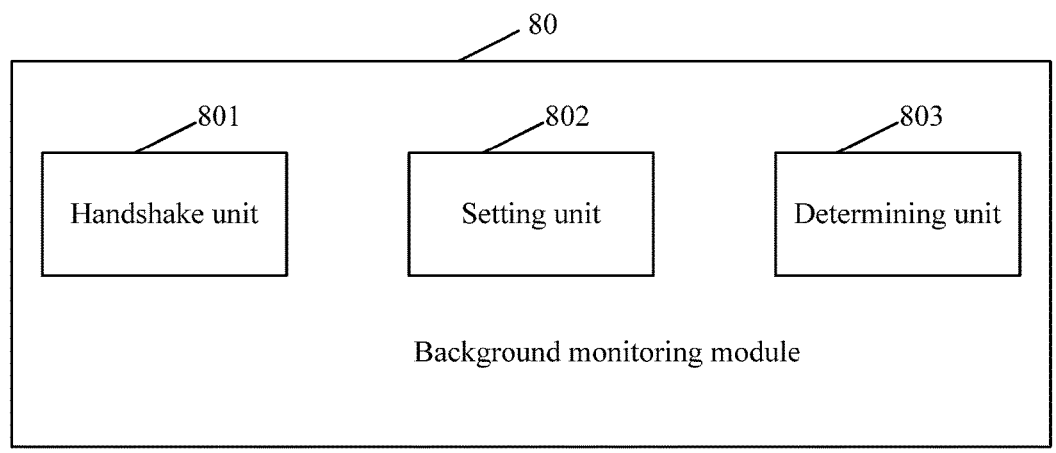
FIG. 3 is a schematic diagram showing specific function modules of a background monitoring module in FIG. 2.

In a preferred embodiment, as illustrated in FIG. 3, on the basis of the embodiment of FIG. 2, the background monitoring module 80 includes:

a handshake unit 801, configured to receive a handshake command of a mobile terminal and establish communication with the mobile terminal;

a setting unit 802, configured to determine whether a handshake is successful according to the handshake command, and configured to set a flag bit of an MHL flag register of the display device according to a result of the determining; and a determining unit 803, configured to determine, according to the flag bit, whether the MHL signal source is connected.

Figure 4:
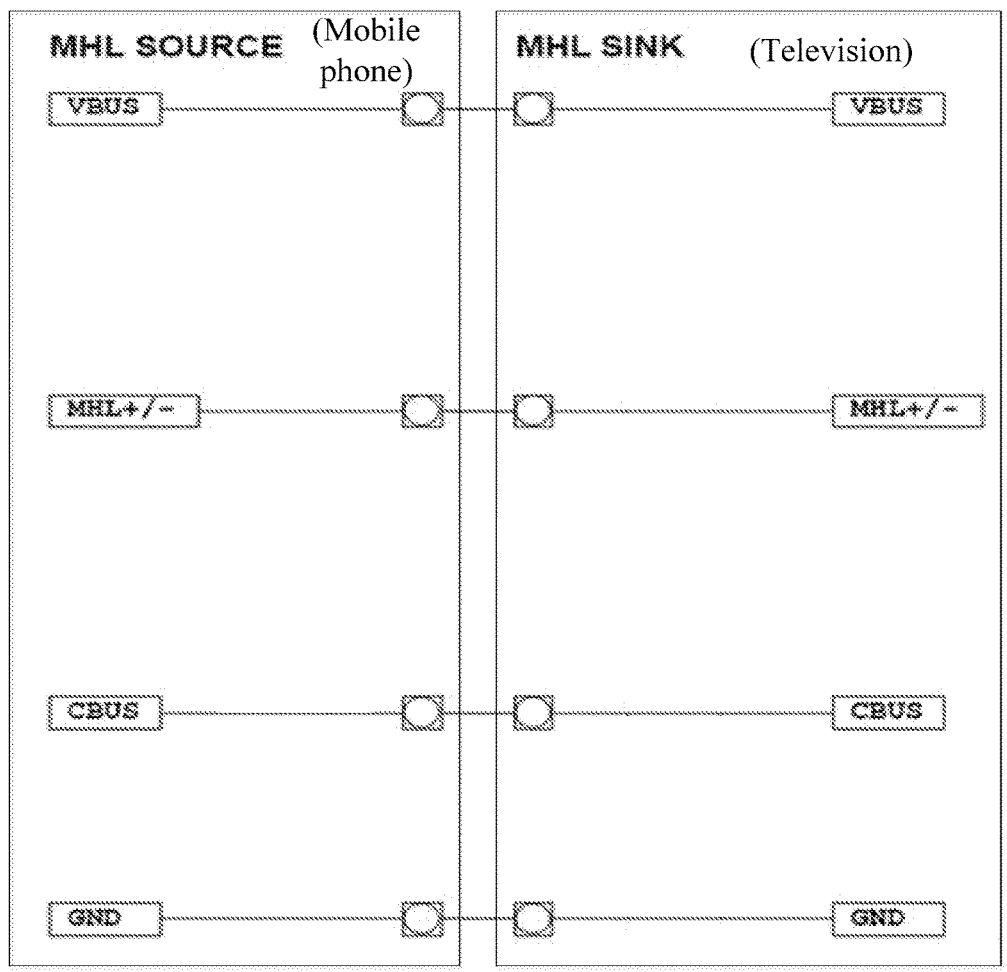
FIG. 4 is a portion of a circuit schematic diagram for a mobile phone connected to a television by using an MHL cable as an example illustrated in FIG. 2.

In the embodiment, the current non MHL signal source pattern is maintained by a central control module of the television, after inserting an MHL cable, the mobile phone is connected to the television. Referring to FIG. 4, after it is detected by the mobile phone (MHL SOURCE) that the CBUS is in the low electrical level, the VBUS output of the mobile phone is first turned off, and whether the VBUS has an output is then detected by the mobile phone. If it is detected within a specific time (defined by the MHL standard) that the VBUS has a 5V power input, the mobile phone starts to discover devices of the same family. If it is not detected by the mobile phone within a specific time that the VBUS has a 5V power input, the mobile phone turns the starts VBUS of itself on, and at the same time also starts to discover devices of the same family. The mobile phone sends a wakeup instruction and a pulse signal (its pulse width and pulse number are according to the MHL standard) to the television (MHL SINK). After the television receives the wakeup instruction and the pulse signal, it is determined that the connected device is an MHL signal source device, then a specific inner-control composite switch is switched in a time sequence according to the MHL protocol standard, the CBUS of the television is drawn to be in the high electrical level, after the Floating CBUS, the CBUS of the television is detected to be in the high electrical level, it is determined that the connected device has an MHL function, meanwhile the mobile phone receives a RxSense signal to complete discovery of devices of the same family.

At this moment, the mobile phone starts to send the MHL signal (and a media signal or another control signal) to the television, and sends an MSC handshake command by using the CBUS and communicates with the television. By using the handshake command, the opposing status (such as current flow through the VBUS, the reading of the EDID, and the output of HDCP and MHL signal) can be learned. After the television and the mobile phone perform successfully a handshake of devices of the same family by using the MHL cable, the flag bit of the MHL flag register of the television is set to be 1 (indicating there is the MHL signal) by the television, otherwise the flag bit is set to be zero (indicating there is not the MHL signal). So far, the television in the background determines whether the MHL signal source is connected by querying the value of the flag bit of the MHL flag register.

In addition, since the prior art is limited to that a handshake action can be done only in the MHL signal source pattern. In the non MHL signal source pattern, the input of the MHL signal is cut off so that the handshake action can not be done in the background of the television. In the prior art, every time the handshake action starts to be done only after switching to be in the MHL signal source pattern, so that every time it costs a long time to display an MHL image, sometimes it even costs 10 seconds or more, very slowly. In the embodiment, in the non MHL signal source pattern, as the MHL signal source is connected in the background, the handshake action is performed instantly in the background. The problem that the image is displayed slowly due to the MHL signal can be solved. When the user switches to the MHL signal source pattern, the image output according to the MHL signal can be viewed instantly, which improves the user experience.

Figure 5:
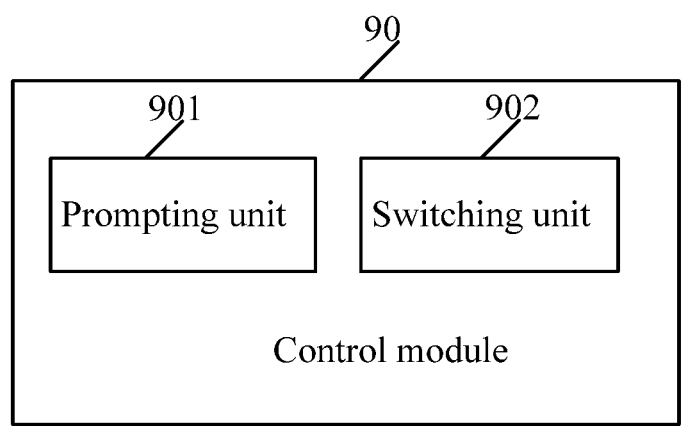
FIG. 5 is a schematic diagram showing specific function modules of a control module in FIG. 2.

In a preferred embodiment, as illustrated in FIG. 5, on the basis of the embodiment of FIG. 2, the background control module 90 includes:

a prompting unit 901, configured to display, if the MHL signal source is monitored to be connected, prompt information indicating whether the current signal source pattern of the display device is switched to be the MHL signal source pattern; and a switching unit 902, configured to receive a switching instruction and control a second MHL interface transfer switch 70, pre-disposed between the signal decoding processor 30 and the background monitoring module 80, to be on according the switching instruction, and configured to switch the current signal source pattern of the display device to be the MHL signal source pattern.

In the embodiment, referring to FIG. 2, when the television monitors that the MHL signal source is connected, incoming reminder information is displayed to the user according to a pre-configured incoming notification information, or a current signal source pattern of the display device is directly switched to be the MHL signal source pattern.

When the television switches signal source pattern, prompt information indicating whether the current signal source pattern of the display device is switched to be the MHL signal source pattern is displayed on the television. The user selects according to the prompt information. If the user selects "Yes", the television receives the switching instruction according to the user's selection. The second MHL interface transfer switch 70, pre-disposed between the signal decoding processor 30 and the background monitoring module 80, is controlled to be on according the switching instruction. By turning on the second MHL interface transfer switch 70, the television receives the MHL signal sent by the mobile phone.

In the embodiment, after turning on the second MHL interface transfer switch 70, a media file in the mobile phone is sent to the signal decoding processor 30 of the television for processing, and at last it is implemented that the media file in the mobile phone is displayed on the television.

In addition, the second MHL interface transfer switch 70 in the non MHL signal source pattern is off, which ensures that the input of the MHL signal can be cut off in the non MHL signal source pattern, and thus ensures that the signal decoding processor 30 in the non MHL signal source pattern gets rid of interference from the MHL signal while working.

In addition, for example, the second MHL interface transfer switch 70 in FIG. 2 may be formed by different forms or combinations of electronic switching circuits in the external or the internal of the IC of the SOC, thus different switching control corresponding to front and rear ends of the MHL signal can be implemented.

In a preferred embodiment, on the basis of the embodiment of FIG. 2, the display device further includes: a configuring module, configured to configure the incoming notification information of the display device to be the incoming reminder information or switching information indicating the current signal source pattern of the display device is switched to be the MHL signal source pattern, and configured to provision an incoming notification function of the display device.

In the embodiment, the user can pre-configure the incoming notification information of the television. When the MHL signal is connected, the television performs a display according to the configured incoming notification information or switches the signal source pattern.

In addition, when the television is in the non MHL signal source pattern, the incoming notification function must be provisioned so as that a reminder is performed when the MHL signal is connected.

Figure 6:
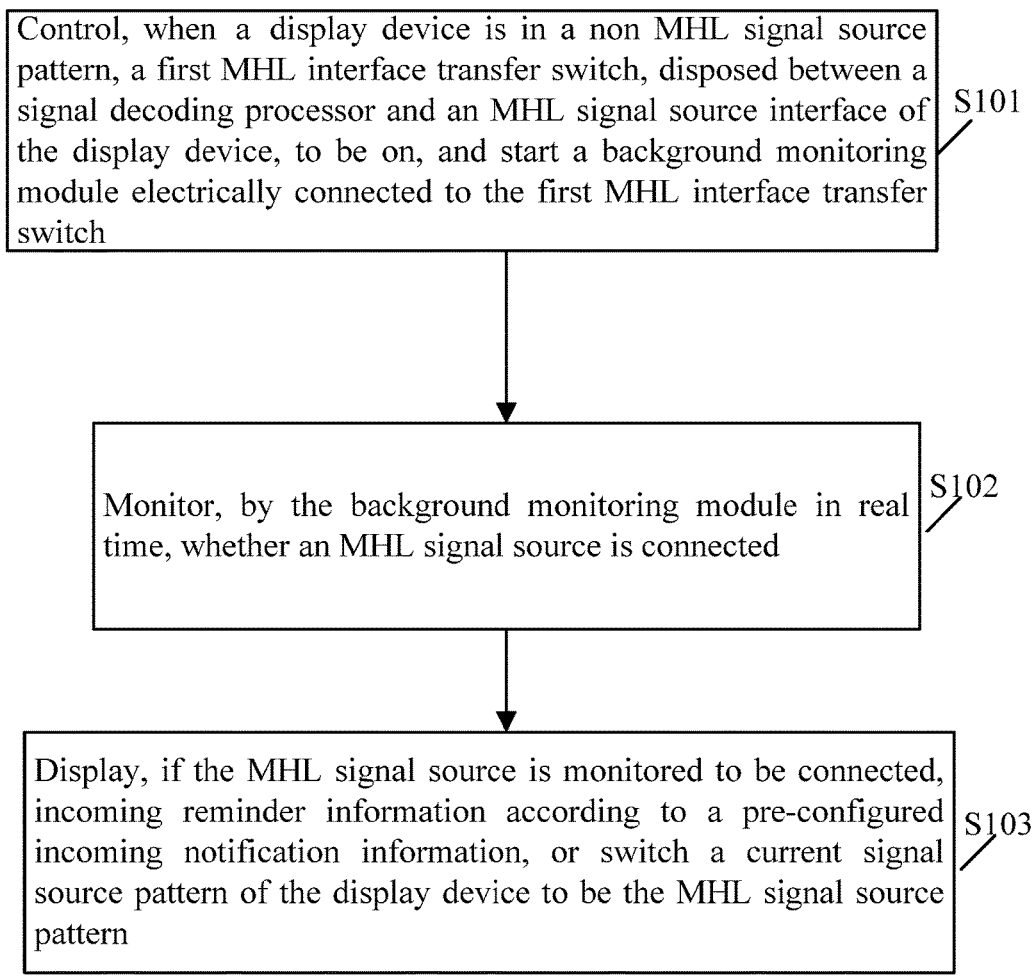
FIG. 6 is a schematic flowchart of an embodiment of a method for implementing an incoming notification function with respect to an MHL signal source according to the present disclosure.

The present disclosure further provides a method for implementing an incoming notification function with respect to an MHL signal source. As illustrated in FIG. 6, in an embodiment, the method includes:

Step S101: Control, when the display device is in a non MHL signal source pattern, a first MHL interface transfer switch, disposed between a signal decoding processor and an MHL signal source interface of the display device, to be on, and start a background monitoring module electrically connected to the first MHL interface transfer switch.

Step S102: Monitor, by the background monitoring module in real time, whether an MHL signal source is connected.

In the embodiment, the display device may be a television or another display device, and a mobile terminal may be a mobile phone or a tablet. Throughout the present disclosure, the display device is exemplified as the television, and the mobile terminal is exemplified as the mobile phone. The mobile phone and television both have MHL signal source interfaces, and the mobile phone is connected to the television by using an MHL cable.

By using a remote control and a panel, a user sends a signal switching command to the television to be switched in any non MHL signal source pattern, that is the television is watched in the non MHL signal source pattern, and the non MHL signal source pattern includes other signal source patterns, such as a WiFi signal source pattern, a VGA signal source pattern or a USB signal source pattern. When the MHL cable is connected to television successfully, and an incoming notification function is turned on, after the mobile phone is connected to television by using the MHL cable, the television performs monitoring in real time in the background and monitors whether the MHL signal source is connected.

In a specific implementation manner, when the television is in the non MHL signal source pattern, the first MHL interface transfer switch, disposed between the signal decoding processor and the MHL signal source interface of the display device, is controlled to be on. The start of the background monitoring procedure is triggered by turning on the first MHL interface transfer switch, and whether the MHL signal source is connected is monitored in real time.

Step S103: Display, if the MHL signal source is monitored to be connected, incoming reminder information according to a pre-configured incoming notification information, or switch a current signal source pattern of the display device to be the MHL signal source pattern.

In the embodiment, the user can pre-configure the incoming notification information to be reminder information or signal source pattern switching information. If it is monitored that the MHL signal source is connected, when the incoming notification information is configured to be the reminder information, the incoming reminder information is displayed on the television to remind the user; when the incoming notification information is configured to be signal source pattern switching information, the current signal source pattern of the display device is directly switch to be the MHL signal source pattern by the television, so that a media file in the mobile phone can be displayed on the television.

Figure 7:
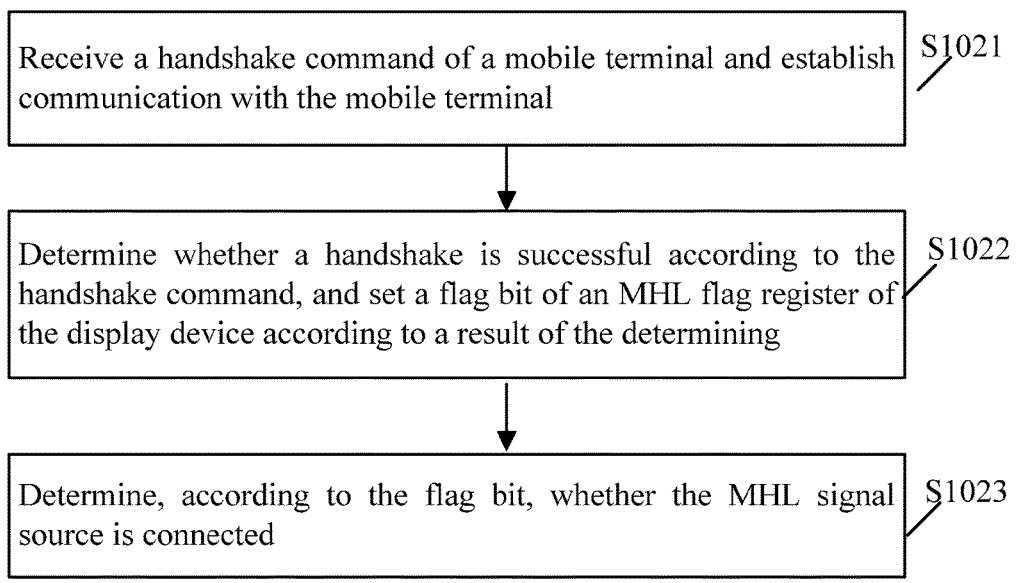
FIG. 7 is a schematic flowchart of a specific implementation of step S102 in FIG. 6.

In a preferred embodiment, as illustrated in FIG. 7, on the basis of the embodiment of FIG. 6, Step S102 includes:

Step S1021: Receive a handshake command of a mobile terminal and establish communication with the mobile terminal.

Step S1022: Determine whether a handshake is successful according to the handshake command, and set a flag bit of an MHL flag register of the display device according to a result of the determining.

Step S1023: Determine, according to the flag bit, whether the MHL signal source is connected.

In the embodiment, the current non MHL signal source pattern is maintained by a central control unit of the television, after inserting an MHL cable, the mobile phone is connected to the television. After it is detected by the mobile phone (MHL SOURCE) that the CBUS is in the low electrical level, the VBUS output of the mobile phone is first turned off, and whether the VBUS has an output is then detected by the mobile phone. If it is detected within a specific time (defined by the MHL standard) that the VBUS has a 5V power input, the mobile phone starts to discover devices of the same family. If it is not detected by the mobile phone within a specific time that the VBUS has a 5V power input, the mobile phone turns the starts VBUS of itself on, and at the same time also starts to discover devices of the same family. The mobile phone sends a wakeup instruction and a pulse signal (its pulse width and pulse number are according to the MHL standard) to the television (MHL SINK). After the television receives the wakeup instruction and the pulse signal, it is determined that the connected device is an MHL signal source device, then a specific inner-control composite switch is switched in a time sequence according to the MHL protocol standard, the CBUS of the television is drawn to be in the high electrical level, after the Floating CBUS, the CBUS of the television is detected to be in the high electrical level, it is determined that the connected device has an MHL function, meanwhile the mobile phone receives a RxSense signal to complete discovery of devices of the same family.

At this moment, the mobile phone starts to send the MHL signal (and a media signal or another control signal) to the television, and sends an MSC handshake command by using the CBUS and communicates with the television. By using the handshake command, the opposing status (such as current flow through the VBUS, the reading of the EDID, and the output of HDCP and MHL signal) can be learned. After the television and the mobile phone perform successfully a handshake of devices of the same family by using the MHL cable, the flag bit of the MHL flag register of the television is set to be 1 (indicating there is the MHL signal) by the television, otherwise the flag bit is set to be zero (indicating there is not the MHL signal). So far, the television in the background determines whether the MHL signal source is connected by querying the value of the flag bit of the MHL flag register.

In addition, since the prior art is limited to that a handshake action can be done only in the MHL signal source pattern. In the non MHL signal source pattern, the input of the MHL signal is cut off so that the handshake action can not be done in the background of the television. In the prior art, every time the handshake action starts to be done only after switching to be in the MHL signal source pattern, so that every time it costs a long time to display an MHL image, sometimes it even costs 10 seconds or more, very slowly. In the embodiment, in the non MHL signal source pattern, as the MHL signal source is connected in the background, the handshake action is performed instantly in the background. The problem that the image is displayed slowly due to the MHL signal can be solved. When the user switches to the MHL signal source pattern, the image output according to the MHL signal can be viewed instantly, which improves the user experience.

Figure 8:
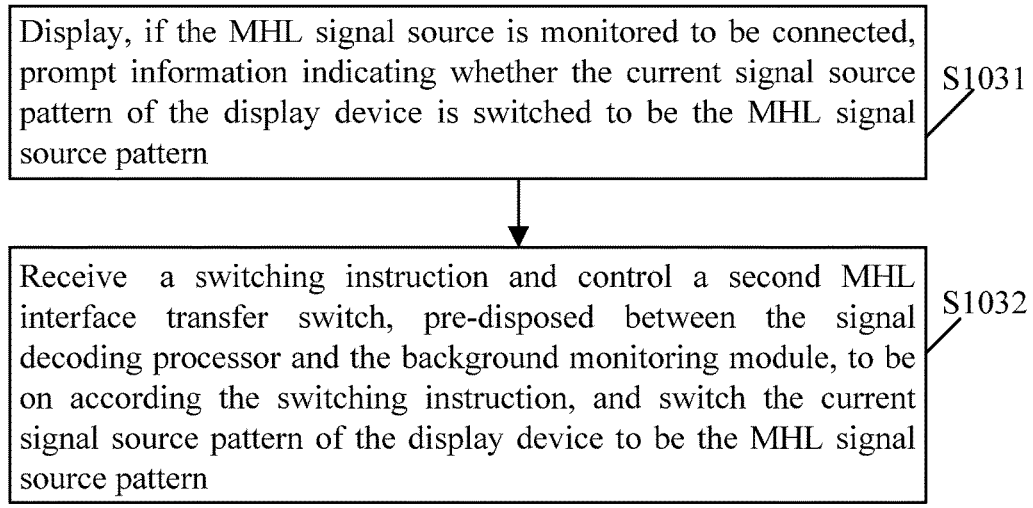
FIG. 8 is a schematic flowchart of a specific implementation of step S 103 in FIG. 6.

In a preferred embodiment, as illustrated in FIG. 8, on the basis of the embodiment of FIG. 6, Step S103 includes:

Step S1031: Display, if the MHL signal source is monitored to be connected, prompt information indicating whether the current signal source pattern of the display device is switched to be the MHL signal source pattern.

Step S1032: Receive a switching instruction and control a second MHL interface transfer switch, pre-disposed between the signal decoding processor and the background monitoring module, to be on according the switching instruction, and switch the current signal source pattern of the display device to be the MHL signal source pattern.

In the embodiment, when the television monitors that the MHL signal source is connected, incoming reminder information is displayed to the user according to a pre-configured incoming notification information, or a current signal source pattern of the display device is directly switched to be the MHL signal source pattern.

When the television switches signal source pattern, prompt information indicating whether the current signal source pattern of the display device is switched to be the MHL signal source pattern is displayed on the television. The user selects according to the prompt information. If the user selects "Yes", the television receives the switching instruction according to the user's selection. The second MHL interface transfer switch, pre-disposed between the signal decoding processor and the background monitoring module, is controlled to be on according the switching instruction. By turning on the second MHL interface transfer switch, the television receives the MHL signal sent by the mobile phone.

In the embodiment, after turning on the second MHL interface transfer switch, a media file in the mobile phone is sent to the signal decoding processor of the television for processing, and at last it is implemented that the media file in the mobile phone is displayed on the television.

In addition, the second MHL interface transfer switch in the non MHL signal source pattern is off, which ensures that the input of the MHL signal can be cut off in the non MHL signal source pattern, and thus ensures that the signal decoding processor in the non MHL signal source pattern gets rid of interference from the MHL signal while working.

In addition, for example, the second MHL interface transfer switch may be formed by different forms or combinations of electronic switching circuits in the external or the internal of the IC of the SOC, thus different switching control corresponding to front and rear ends of the MHL signal can be implemented.

In a preferred embodiment, on the basis of the embodiment of FIG. 6, before Step S101, the method for implementing an incoming notification function with respect to an MHL signal source further includes: configuring the incoming notification information of the display device to be the incoming reminder information or switching information indicating the current signal source pattern of the display device is switched to be the MHL signal source pattern, and provisioning an incoming notification function of the display device.

In the embodiment, the user can pre-configure the incoming notification information of the television. When the MHL signal is connected, the television performs a display according to the configured incoming notification information or switches the signal source pattern.

In addition, when the television is in the non MHL signal source pattern, the incoming notification function must be provisioned so as that a reminder is performed when the MHL signal is connected.

The foregoing is only preferred embodiments of the present disclosure is not patented and therefore limit the scope of the present disclosure, any use of the contents of the present specification and drawings made equivalent or equivalent structural transformation process, either directly or indirectly used in other relevant technology, are included in the patent empathy scope of the invention.

What is claimed is:

1. A display device, wherein the display device comprises:
   a control module, configured to control, when the display device is in a non MHL signal source pattern, a first MHL interface transfer switch, disposed between a signal decoding processor and an MHL signal source interface of the display device, to be on, and configured to start a background monitoring module electrically connected to the first MHL interface transfer switch, and further configured to display, if an MHL signal source is monitored to be connected, incoming reminder information according to a pre-configured incoming notification information or switch a current signal source pattern of the display device to be the MHL signal source pattern; and
   the background monitoring module, configured to monitor in real time whether the MHL signal source is connected;
   wherein the background monitoring module comprises:
   a handshake unit, configured to receive a handshake command of a mobile terminal and establish communication with the mobile terminal;
   a setting unit, configured to determine whether a handshake is successful according to the handshake command, and configured to set a flag bit of an MHL flag register of the display device according to a result of the determining; and a determining unit, configured to determine, according to the flag bit, whether the MHL signal source is connected.

2. The display device according to claim 1, wherein the non MHL signal source pattern comprises a WiFi signal source pattern, a VGA signal source pattern or a USB signal source pattern.

3. The display device according to claim 1, wherein the control module comprises:

a prompting unit, configured to display, if the MHL signal source is monitored to be connected, prompt information indicating whether the current signal source pattern of the display device is switched to be the MHL signal source pattern; and a switching unit, configured to receive a switching instruction and control a second MHL interface transfer switch, pre-disposed between the signal decoding processor and the background monitoring module, to be on according the switching instruction, and configured to switch the current signal source pattern of the display device to be the MHL signal source pattern.

4. The display device according to claim 3, wherein the display device further comprises:

a configuring module, configured to configure the incoming notification information of the display device to be the incoming reminder information or switching information indicating the current signal source pattern of the display device is switched to be the MHL signal source pattern, and configured to provision an incoming notification function of the display device.

5. The display device according to claim 1, wherein the display device further comprises:

a configuring module, configured to configure the incoming notification information of the display device to be the incoming reminder information or switching information indicating the current signal source pattern of the display device is switched to be the MHL signal source pattern, and configured to provision an incoming notification function of the display device.

6. A method for implementing an incoming notification function with respect to an MHL signal source, applied in a display device, wherein the method for implementing an incoming notification function with respect to an MHL signal source comprises the following steps:

controlling, when the display device is in a non MHL signal source pattern, a first MHL interface transfer switch, disposed between a signal decoding processor and an MHL signal source interface of the display device, to be on, and starting a background monitoring module electrically connected to the first MHL interface transfer switch;

monitoring, by the background monitoring module in real time, whether an MHL signal source is connected; and displaying, if the MHL signal source is monitored to be connected, incoming reminder information according to a pre-configured incoming notification information, or switching a current signal source pattern of the display device to be the MHL signal source pattern;

wherein the step of the monitoring, by the background monitoring module in real time, whether an MHL signal source is connected comprises:

receiving a handshake command of a mobile terminal and establishing communication with the mobile terminal;

determining whether a handshake is successful according to the handshake command, and setting a flag bit of an MHL flag register of the display device according to a result of the determining; and determining, according to the flag bit, whether the MHL signal source is connected.

7. The method for implementing an incoming notification function with respect to an MHL signal source according to claim 6, wherein the non MHL signal source pattern comprises a WiFi signal source pattern, a VGA signal source pattern or a USB signal source pattern.

8. The method for implementing an incoming notification function with respect to an MHL signal source according to claim 6, wherein the step of the switching a current signal source pattern of the display device to be the MHL signal source pattern comprises:

displaying, if the MHL signal source is monitored to be connected, prompt information indicating whether the current signal source pattern of the display device is switched to be the MHL signal source pattern; and receiving a switching instruction and controlling a second MHL interface transfer switch, pre-disposed between the signal decoding processor and the background monitoring module, to be on according the switching instruction, and switching the current signal source pattern of the display device to be the MHL signal source pattern.

9. The method for implementing an incoming notification function with respect to an MHL signal source according to claim 8, wherein the method for implementing an incoming notification function with respect to an MHL signal source further comprises:

configuring the incoming notification information of the display device to be the incoming reminder information or switching information indicating the current signal source pattern of the display device is switched to be the MHL signal source pattern, and provisioning an incoming notification function of the display device.

10. The method for implementing an incoming notification function with respect to an MHL signal source according to claim 6, wherein the method for implementing an incoming notification function with respect to an MHL signal source further comprises:

configuring the incoming notification information of the display device to be the incoming reminder information or switching information indicating the current signal source pattern of the display device is switched to be the MHL signal source pattern, and provisioning an incoming notification function of the display device.

* * * * *